United States Patent
Guarnizo Martinez et al.

(10) Patent No.: US 9,047,780 B2
(45) Date of Patent: Jun. 2, 2015

(54) COLLISION MITIGATION SYSTEMS AND METHODS USING DRIVER ATTENTIVENESS

(71) Applicant: Robert Bosch GmbH, Stuttgart (DE)

(72) Inventors: Pablo Luis Guarnizo Martinez, Gerlingen (DE); Jingshen Yu, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/768,572

(22) Filed: Feb. 15, 2013

(65) Prior Publication Data

US 2014/0142798 A1    May 22, 2014

Related U.S. Application Data

(60) Provisional application No. 61/727,291, filed on Nov. 16, 2012.

(51) Int. Cl.
     *G08G 1/16*            (2006.01)
     *B60W 10/18*         (2012.01)
     (Continued)

(52) U.S. Cl.
     CPC .................. *G08G 1/16* (2013.01); *B60W 50/14* (2013.01); *B60W 10/18* (2013.01); *B60W 30/09* (2013.01);
     (Continued)

(58) Field of Classification Search
     CPC ......... G01S 13/931; G01S 13/93; G08G 1/16; G08G 1/163; G08G 1/166
     USPC ............... 701/23–26, 36, 70, 72, 78, 83, 300, 701/301; 180/271, 272; 340/573.1, 340/574–576; 303/19
     See application file for complete search history.

(56) References Cited

U.S. PATENT DOCUMENTS 5,253,050 A * 10/1993 Karasudani .................. 348/118
5,984,034 A     11/1999 Morisawa et al.
(Continued)

FOREIGN PATENT DOCUMENTS

DE       4339066      5/1995
DE       10317254     11/2004
(Continued)

OTHER PUBLICATIONS

Brannstrom, M. et al., "A situation and threat assessment algorithm for a rear-end collision avoidance system," Intelligent Vehicles Symposium, 2008 IEEE, Jun. 4-6, 2998, pp. 102-107.
(Continued)

*Primary Examiner* — Mary Cheung
*Assistant Examiner* — Rodney Butler
(74) *Attorney, Agent, or Firm* — Michael Best & Friedrich LLP

(57) ABSTRACT

Methods and systems for mitigating vehicle collisions. One system includes a processor configured to set a driver attention level to at least one of an attentive level and an inattentive level based on a driver's interaction with at least one device located within a vehicle. The processor is also configured to automatically pre-fill at least one brake line of the vehicle when the driver attention level is set to the inattentive level, automatically perform a brake jerk when the driver attention level is set to the inattentive level and a distance between the vehicle and a closest object detected around the vehicle is less than a first predetermined distance, and automatically slow the vehicle when the driver attention level is set to the inattentive level and a distance between the vehicle and a closest object detected around the vehicle is less than a second predetermined distance.

13 Claims, 6 Drawing Sheets

(51) Int. Cl.
   *B60W 30/09* (2012.01)
   *B60W 40/09* (2012.01)
   *B60W 50/14* (2012.01)
   *B60W 40/08* (2012.01)

(52) U.S. Cl.
   CPC ....... *B60W 40/09* (2013.01); *B60W 2040/0818* (2013.01); *B60W 2040/0872* (2013.01); *B60W 2520/10* (2013.01); *B60W 2540/04* (2013.01); *B60W 2540/18* (2013.01); *B60W 2540/20* (2013.01); *B60W 2550/10* (2013.01)

(56) References Cited

U.S. PATENT DOCUMENTS

| | | | |
|---|---|---|---|
| 6,842,684 | B1 | 1/2005 | Kade et al. |
| 7,292,152 | B2 * | 11/2007 | Torkkola et al. ............. 340/576 |
| 7,605,694 | B2 * | 10/2009 | Prost-Fin et al. ............. 340/438 |
| 7,739,008 | B2 | 6/2010 | Cieler et al. |
| 2005/0075770 | A1 | 4/2005 | Taylor et al. |
| 2006/0267748 | A1 | 11/2006 | Knoop et al. |
| 2007/0146146 | A1 | 6/2007 | Kopf et al. |
| 2008/0266139 | A1 | 10/2008 | Kim |
| 2009/0037055 | A1 * | 2/2009 | Danner et al. .................. 701/45 |
| 2011/0210867 | A1 | 9/2011 | Benedikt |
| 2011/0282549 | A1 | 11/2011 | Choi |
| 2011/0282558 | A1 | 11/2011 | Park |
| 2012/0001771 | A1 | 1/2012 | Roth et al. |
| 2012/0010791 | A1 | 1/2012 | Conn et al. |
| 2012/0173068 | A1 * | 7/2012 | Seiter et al. ..................... 701/23 |
| 2012/0212353 | A1 | 8/2012 | Fung et al. |
| 2012/0265416 | A1 | 10/2012 | Lu et al. |
| 2013/0245886 | A1 * | 9/2013 | Fung et al. ..................... 701/36 |

FOREIGN PATENT DOCUMENTS

| | | |
|---|---|---|
| DE | 10335757 | 3/2005 |
| DE | 102004017365 | 10/2005 |
| DE | 102006044803 | 3/2008 |
| DE | 102007039617 | 2/2009 |
| DE | 102008013519 | 9/2009 |
| DE | 102009057646 | 6/2011 |
| DE | 102010063792 | 6/2012 |
| EP | 0347242 | 12/1989 |
| EP | 0451593 | 10/1991 |
| EP | 1750236 | 2/2007 |
| FR | 2855481 | 12/2004 |
| GB | 2284028 | 5/1995 |
| GB | 2431992 | 5/2007 |
| GB | 2479998 | 11/2011 |
| JP | H0948263 | 2/1997 |
| JP | 2004050925 | 2/2004 |
| JP | 2004085214 | 3/2004 |
| JP | 2005001581 | 1/2005 |
| JP | 2008137442 | 6/2008 |
| JP | 2009202618 | 9/2009 |
| KR | 20070091931 | 9/2007 |
| KR | 20080014373 | 2/2008 |
| KR | 20080016242 | 2/2008 |
| WO | 2007031259 | 3/2007 |
| WO | 2007074048 | 7/2007 |

OTHER PUBLICATIONS

Breuer, J. et al., "New systems to avoid/mitigate rear-end collisions," VDI Berichte, 2006, pp. 393-402, Abstract Only.
International Search Report and Written Opinion for Application No. PCT/US2013/070344 dated Jan. 29, 2014 (12 pages).

* cited by examiner

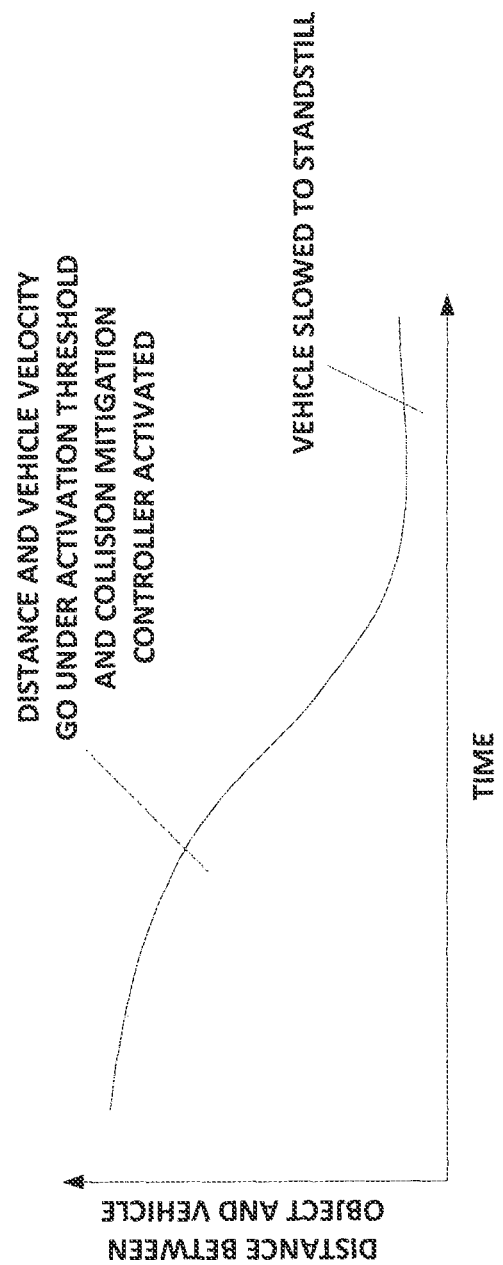

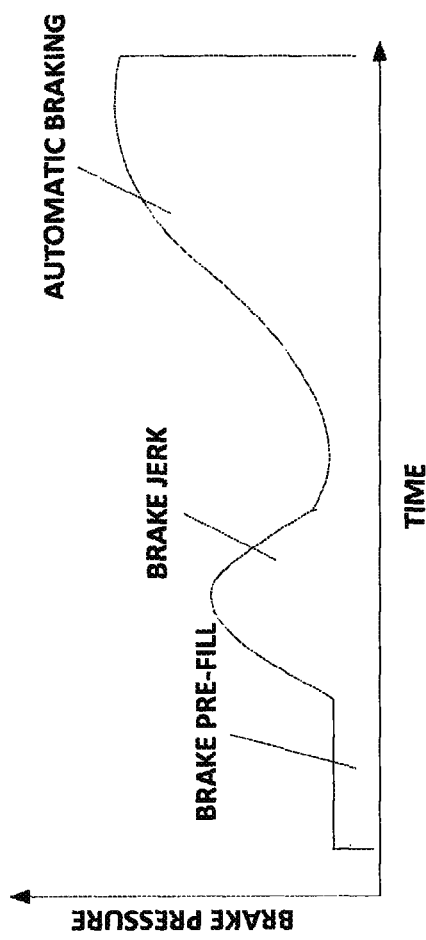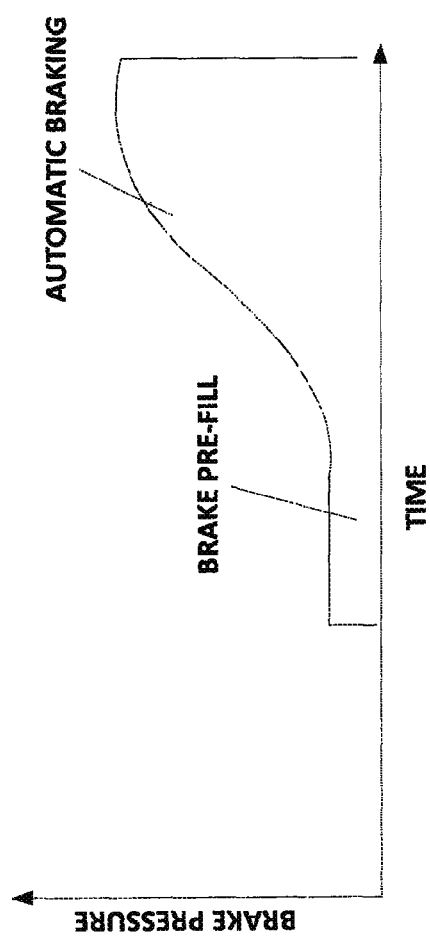

COLLISION MITIGATION SYSTEMS AND METHODS USING DRIVER ATTENTIVENESS

RELATED APPLICATIONS

The present application claims priority to U.S. Provisional Application No. 61/727,291 filed Nov. 16, 2012, the entire contents of which is hereby incorporated by reference.

BACKGROUND

The present invention relates to systems and methods for helping a driver avoid or mitigate a collision when maneuvering a vehicle at low speeds. For example, when backing-up a vehicle, it is often difficult for a driver to see people or objects located around the vehicle, and, in some situations, it may be impossible for a driver to see people or objects located in the driver's blind spots. Bad weather conditions and large blind spots (e.g., created by large vehicles) also increase the driver's difficulty in seeing people and objects located around the vehicle.

SUMMARY

Many existing collision mitigation systems perform collision mitigation based solely on a detected object. However, if a driver is fully attentive, mitigation may not be necessary and the driver may find such systems unhelpful and bothersome. In addition, although some existing collision mitigation systems attempt to take driver attentiveness into account, these systems require specifically-designed devices, such as cameras and other sensors, placed within the interior of the vehicle. For example, existing systems use a camera to track eye motion of the driver. Adding these additional devices to a vehicle increases the cost and complexity of these mitigation systems (e.g., if any of the devices malfunction or fail the mitigation system may not operate properly).

Accordingly, embodiments of the present invention provide systems and methods for mitigating vehicle collisions. In one embodiment, the invention warns the driver about potential hazards and prepares the vehicle for driver reaction. Embodiments of the invention can also reduce the consequence of an imminent impact by reducing the vehicle's speed. Furthermore, embodiments of the present invention warn the driver if he or she is not attentive enough for a particular vehicle maneuver, such as a back-up maneuver.

One embodiment of the invention provides a system for mitigating vehicle collisions. The system includes a processor configured to set a driver attention level to at least one of an attentive level and an inattentive level based on a driver's interaction with at least one device located within a vehicle. The processor is also configured to automatically pre-fill at least one brake line of the vehicle when the driver attention level is set to the inattentive level, automatically perform a brake jerk when the driver attention level is set to the inattentive level and a distance between the vehicle and a closest object detected around the vehicle is less than a first predetermined distance, and automatically slow the vehicle when the driver attention level is set to the inattentive level and a distance between the vehicle and a closest object detected around the vehicle is less than a second predetermined distance.

Another embodiment of the invention provides a method for mitigating vehicle collisions. The method includes setting, at a processor, a driver attention level based on a driver's interaction with an entertainment system, at least one turn indicator, and a steering wheel located within a vehicle, wherein the driver attention level is set to at least one of an attentive level and an inattentive level. The method also includes automatically controlling at least a portion of the vehicle based on the driver attention level, a current vehicle velocity, and a distance between the vehicle and a closest object detected around the vehicle.

Other aspects of the invention will become apparent by consideration of the detailed description and accompanying drawings.

BRIEF DESCRIPTION OF THE DRAWINGS

FIG. 4 illustrates a distance between a closest object and a vehicle during collision mitigation.

FIG. 5A illustrates brake pressure during collision mitigation for an inattentive driver.

FIG. 5B illustrates brake pressure during collision mitigation for an attentive driver.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
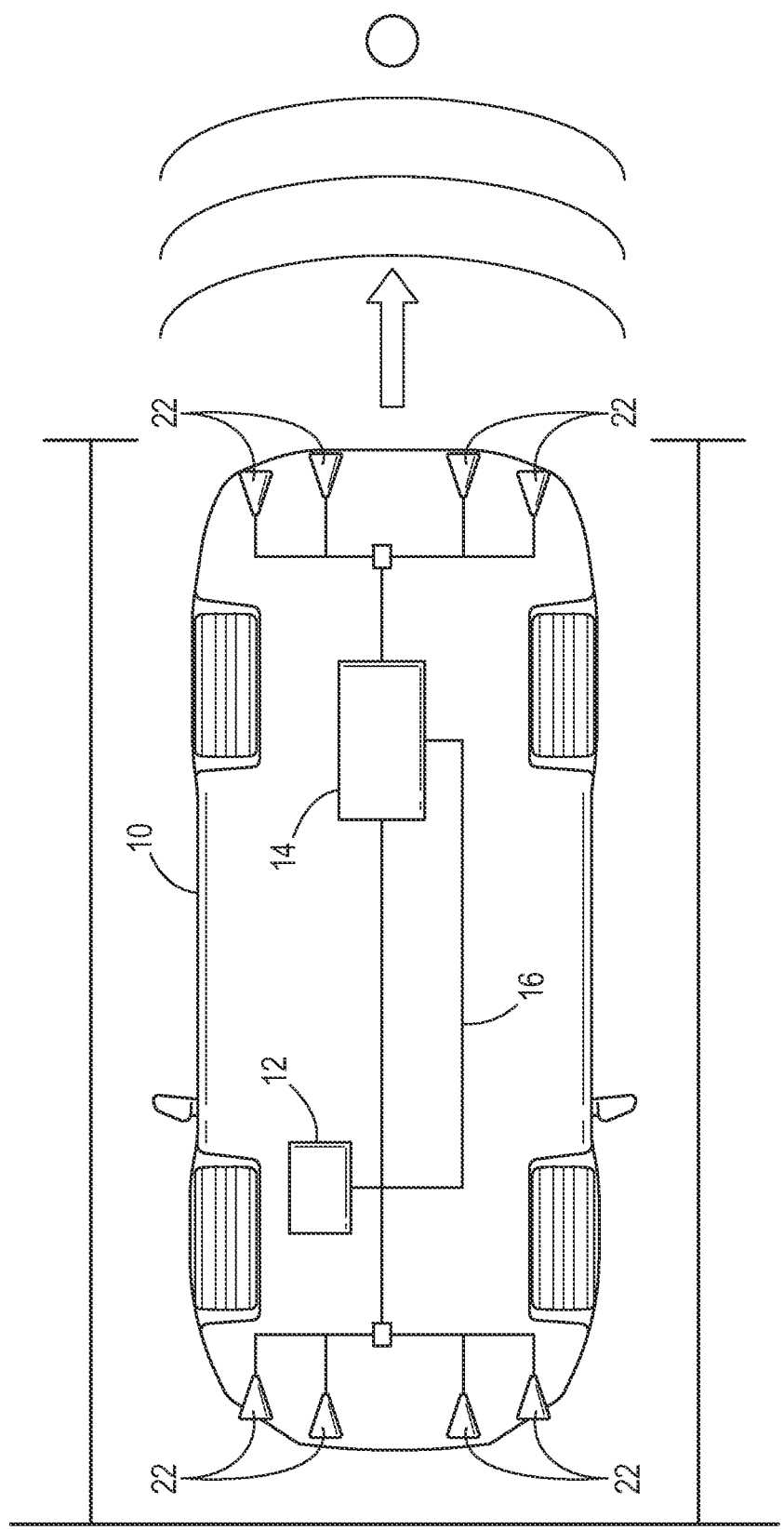
FIG. 1 schematically illustrates a vehicle including an object detection controller and a collision mitigation controller.

FIG. 1 illustrates a vehicle 10. The vehicle 10 includes an object detection controller 12 and a collision mitigation controller 14. The object detection controller 12 and the collision mitigation controller system 14 are connected to a network, such as a controller area network ("CAN") bus 16, that allows the controllers 12 and 14 to exchange data. As illustrated in FIG. 1, one or more environment sensors 22 are also connected to the bus 16. Although the bus 16 is shown in the vehicle 10 as connecting the various components, other connections between the components, whether wired, wireless, direct, or indirect, are possible.

The environment sensors 22 include one or more radar, sonar, ultrasonic, and/or optical sensors (e.g., one or more cameras) that are mounted on the surface of the vehicle 10 and detect objects located around the vehicle 10 (e.g., other parked cars, a curb, pedestrians, etc.). As illustrated in FIG. 1, the sensors 22 can be positioned at the front and rear of the vehicle 10 to detect objects located generally in front and behind the vehicle 10. However, it should be understood that the sensors 22 can be mounted at any location on the vehicle 10 to detect objects in any direction. The object detection controller 12 obtains data from the environment sensors 22 and uses the data to detect objects located around the vehicle 10 and their relative positions. For example, at least one of the sensors 22 detects a distance of an object located around the vehicle 10. For example, one or more of the sensors 22 can include a radar sensor (e.g., having a range of up to approximately 250 meters), an ultrasonic sensor (e.g., having a range of approximately 2 to approximately 4 meters), a stereo camera (e.g., having a range of approximately 140 meters), and/or another sensor or set of sensors configured to determine a distance to an object located around the vehicle. In particular, one of the sensors 22 can include a radar sensor that transmits radar waves. The waves bounce off the objects closest to the vehicle 10 and return to the radar sensor. The radar sensor (or the object detection controller 12) calculates how long it took for a wave to bounce back after transmission. With this information, the radar sensor (or the object detection controller 12) determines the distance between the vehicle 10 and a closest object detected around the vehicle 10. As described below, the object detection controller 12 provides this distance information to the collision mitigation controller 14.

Figure 2:
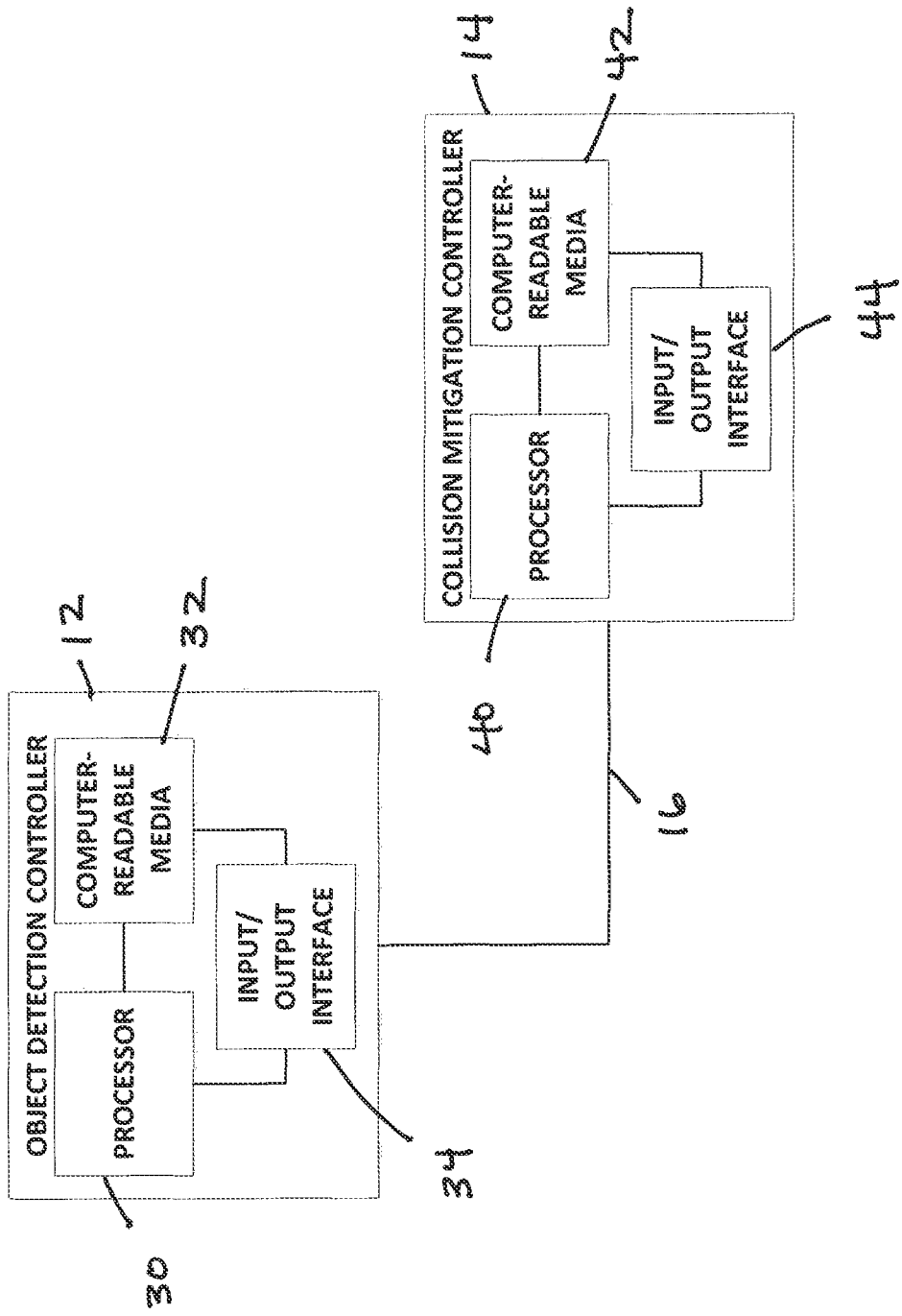
FIG. 2 schematically illustrates the object detection controller and the collision mitigation controller of FIG. 1.

As illustrated in FIG. 2, the object detection controller 12 includes a processor 30, non-transitory computer-readable media 32, and an input/output interface 34. The computer-readable media 32 can include random access memory ("RAM") and/or read-only memory ("ROM"). The input/output interface 34 transmits and receives information over the bus 16. The processor 30 receives information (e.g., from the media 32 and/or the input/output interface 34) and processes the information by executing one or more instructions or modules. The instructions or modules are stored in the computer-readable media 32. The processor 30 also stores information (e.g., information received from the bus 16 or information generated by instructions or modules executed by the processor 30) to the media 32. It should be understood that although only a single processor, input/output interface, and computer-readable media module are illustrated in FIG. 2, the object detection controller 12 can include multiple processing units, memory modules, and/or input/output interfaces.

The instructions stored in the computer-readable media 32 provide particular functionality when executed by the processor 30. In general, the instructions, when executed by the processor 30, use information from the environment sensors 22 to detect objects around the vehicle 10 and their position relative to the vehicle 10. The controller 12 can provide this information to a driver to assist the driver when performing a particular maneuver, such as a back-up maneuver. For example, the controller 12 can display images captured by the environment sensors 22 on a screen located within the vehicle 10. The controller 12 can also provide the driver with information regarding detected objects using other types of user interfaces, including visual and audible interfaces. In some embodiments, the controller 12 is included in a controller or control system that regulates vehicle stability and brakes, such as an electronic stability control ("ESC") system (e.g., the ESP® system provided by Bosch).

As noted above, the controller 12 provides also provide information regarding detected objects to the collision mitigation controller 14. For example, in some embodiments, the controller 12 provides a distance between the vehicle 10 and a closest object detected around the vehicle 10 to the collision mitigation controller 14. The controller 12 can provide this distance information to the controller 14 on an approximately continuous basis to provide the controller 14 with the current position of the closest detected object, which can change as the vehicle 10 and/or the detected object moves. In some embodiments, the object detection controller 12 also provides an enable or "on" bit or signal to the controller 14 for activating the driver assistance provided by the controller 14.

As illustrated in FIG. 2, the collision mitigation controller 14 includes a processor 40, non-transitory computer-readable media 42, and an input/output interface 44. The computer-readable media 42 can include random access memory ("RAM") and/or read-only memory ("ROM"). The input/output interface 44 transmits and receives information over the bus 16. The processor 40 receives information (e.g., from the media 42 and/or the input/output interface 44) and processes the information by executing one or more instructions or modules. The instructions or modules are stored in the computer-readable media 42. The processor 40 also stores information (e.g., information received from the bus 16 or information generated by instructions or modules executed by the processor 40) to the media 42. It should be understood that although only a single processor, input/output interface, and computer-readable media module are illustrated in FIG. 2, the controller 14 can include multiple processing units, memory modules, and/or input/output interfaces.

The instructions stored in the computer-readable media 42 provide particular functionality when executed by the processor 40. In general, the instructions, when executed by the processor 40, mitigate collision during various vehicle maneuvers. For example, in some embodiments, the controller 14 performs collision mitigation during low-speed (e.g., at or below 10 kilometers per hour) backing and parking maneuvers. In particular, the object detection controller 12 can be configured to send an enable bit to the collision mitigation controller 14 when the vehicle 10 is traveling at a speed less than a predetermined threshold (e.g., 10 kilometers per hour) or when the controller 12 determines (or the driver indicates, such as by selecting a button or other indicator within the vehicle 10) that the driver is performing a backing or parking maneuver.

Once activated, controller 14 can mitigate collisions as described in more detail below. For example, as illustrated in FIG. 1, when a driver is backing up the vehicle 10 to exit a parking space, it may be difficult for the driver to see other vehicles or objects located around the vehicle 10. In such a situation, the controller 14 warns the driver in case of a possible collision and decelerates the vehicle 10 to avoid a collision.

Figure 3:
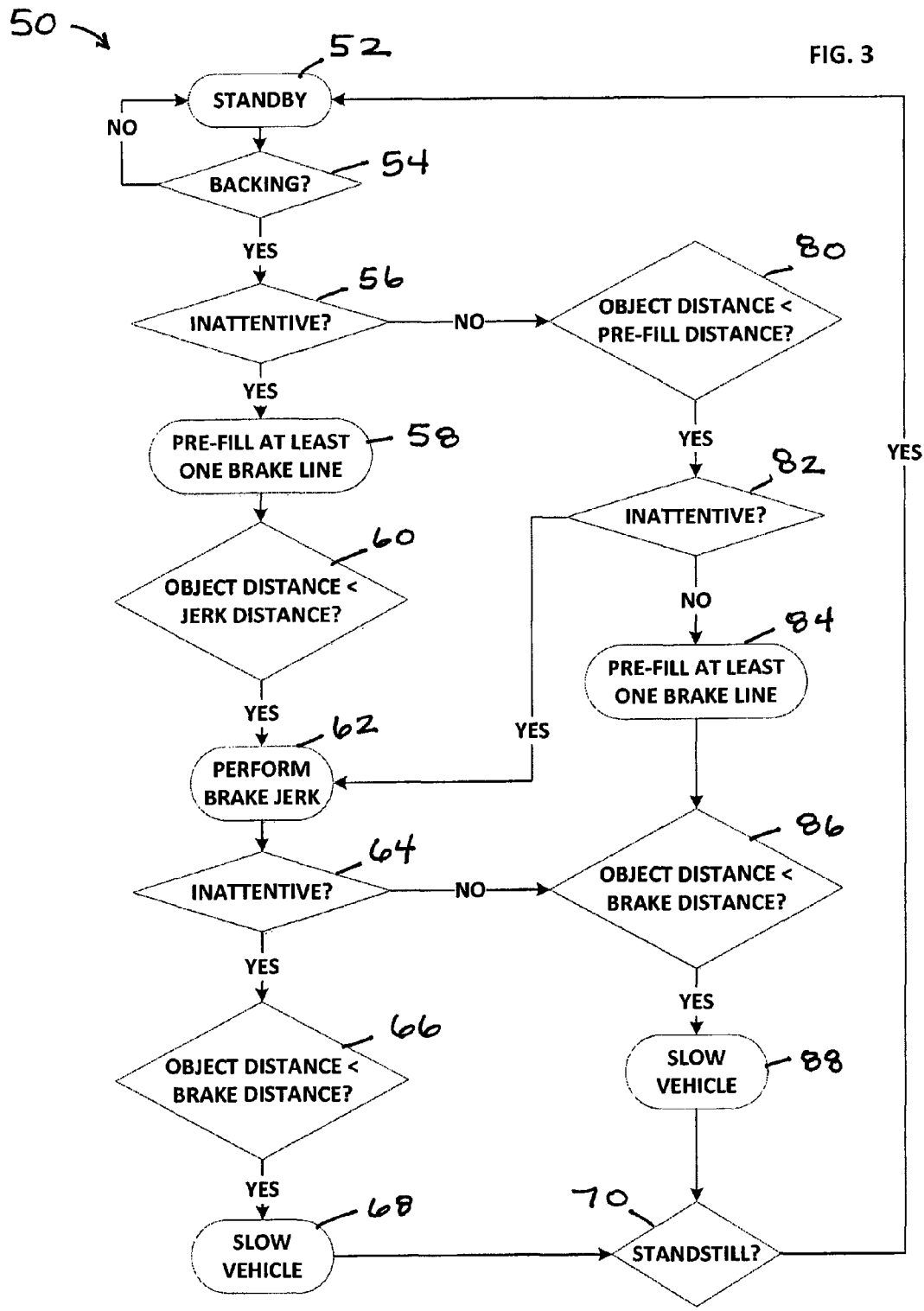
FIG. 3 is a flow chart illustrating a method of mitigating collisions performed by the collision mitigation controller of FIG. 1.

FIG. 3 illustrates a method 50 of mitigating collisions performed by the collision mitigation controller 14. Initially, when the controller 14 is activated, the controller 14 is in a standby state (at step 52). When in the standby state, the controller 14 determines whether the driver is backing up the vehicle 10 (e.g., by looking at a gear selection and a wheel speed) (at step 54). If the driver is not backing up the vehicle 10, the controller 14 remains in a standby state (at step 52). If the driver is backing up the vehicle, the controller 14 determines whether the driver is attentive (at step 56).

To determine the attention level of the driver, the controller 14 monitors different signals (e.g., received over the CAN bus 16) related to activity of the driver, such as the driver's manipulation of or interaction with an entertainment system located within the vehicle 10, a current or previous steering angle (or a change thereof) requested by the driver through the vehicle's steering wheel, and the status of one or more turn indicators (e.g., a left turn indicator and a right turn indicator manually operated by a driver to active a turn signal on the vehicle 10). In particular, the controller 14 receives an entertainment manipulation signal (e.g., over the bus 16). The entertainment manipulation signal is set to "true" when the driver is manipulating or otherwise interacting with the entertainment system and is set to "false" when the driver is not manipulating or otherwise interacting with the entertainment system. It should be understood that the entertainment system included in the vehicle can provide various forms of entertainment or information to the driver, such as audio sources (e.g., radio stations, removable media, such as an audio disk or a flash drive, a portable media player, such as an iPod or an iPhone, etc.), telephone functionality, contact information, driving directions, weather, calendar information, text messages, etc.).

In addition to the entertainment manipulation signal, the controller 14 also receives one or more signals indicating whether a turn indicator is active (i.e., whether the driver has manually-activated a turn signal). In addition, the controller 14 receives one or more signals indicating a current steering angle and/or a change in steering angle (i.e., indicating whether the driver has recently turned the steering wheel). The controller 14 uses the received signals to determine whether the driver is "attentive" or "inattentive." In particular, the controller 14 sets the driver's attention level to "attentive" if the entertainment manipulation signal is "false" and (1) at least one turn indicator is active or (2) the steering angle is changing or has changed within a predetermined period of time. It should be understood that the controller can determine whether the steering angle is or has changed recently by identifying whether the steering angle has changed more than a predetermined minimum amount. Using the minimum amount allows the controller 14 to ignore small steering changes that do not necessarily indicate driver attentiveness.

If the entertainment manipulation signal is "false" but (1) the steering angle has not changed for a predetermined period of time and (2) the driver has not activated a turn indicator, the controller sets the driver's attention level to "inattentive." Also, in some embodiments, as soon as the entertainment manipulation signal is "true," the controller 14 sets the driver's attention level to "inattentive."

As described above, a driver's attention level can be set to either "attentive" or "inattentive" based on the driver's interaction with the entertainment system, turn indicators, and steering wheel. However, it should be understood that a driver's attention level can be set to other levels. In addition, the controller 14 can be configured to set a driver's attention level to a numerical value. The controller 14 can then determine a driver's attentiveness based on whether the numerical value is above, below, or at a predetermined threshold.

Returning to FIG. 3, if the driver attention level is set to "inattentive" (at step 56), the controller 14 takes a first action to mitigate a collision. In particular, the controller 14 pre-fills at least one brake line to prepare the vehicle for potential braking (at step 58). Pre-filling the brake lines and caliper with brake fluid reduces the response time of the vehicle's braking system. The brake jerk can gain the driver's attention. The brake jerk also autonomously slows the vehicle, which also helps mitigate a possible collision. In some embodiments, the controller 14 also checks the vehicle's speed and/or distance to a closest detected object prior to pre-filling the brake lines. For example, the controller 14 can be configured pre-fill the brake lines if the driver is inattentive, the distance between the vehicle 10 and a closest detected object is approximately 3.0 meters or less from the vehicle 10, and the relative speed between the vehicle 10 and the object is approximately 2.5 meters per second or more.

After pre-filling the brake lines, the controller 14 determines if a distance between a closest detected object and the vehicle 10 is less than a first predetermined distance (i.e., an inattentive jerk distance) (at step 60). In some embodiments, the inattentive jerk distance is approximately two meters. If the distance of the closest detected object is less than the inattentive jerk distance, the controller 14 performs a second action to mitigation a collision. In particular, the controller 14 performs a brake jerk (at step 62). In particular, the controller 14 can communicate with a brake controller (e.g., over the bus 16) to request a predetermined brake force application for a predetermined period of time. In some embodiments, the controller 14 also determines a relative speed between the closest detected object and the vehicle 10. For example, the controller 14 can be configured to perform the brake jerk if the driver is inattentive, the distance between the vehicle 10 and the closest detected object is less than the inattentive jerk distance, and the relative speed between the vehicle 10 and the object is approximately 2.5 meters per second or more.

After performing the brake jerk, the controller 14 reassesses the driver's attention level (at step 64). If the driver attention level remains "inattentive," the controller 14 determines whether the current distance of the closest detected object is less than a second predetermined distance (i.e., an inattentive brake distance) (at step 66). In some embodiments the inattentive brake distance is approximately 1.0 meter. If the distance to the closest detected object is less than the inattentive brake distance (i.e., indicating that a collision is likely or imminent), the controller 14 decelerates or slows the vehicle 10 (at step 68). In some embodiments, to slow the vehicle 10, the controller 14 requests a brake application from the brake controller. The controller 14 can also request a torque reduction from an engine controller (e.g., over the bus 16). The requested brake application and/or torque reduction can be a maximum available application or force. In other embodiments, the requested brake application and/or torque reduction can be based on current vehicle velocity and the current distance between the detected closest object and the vehicle 10. As described above for the other actions taken by the controller 14, the controller 14 can also determine a relative speed between the closest detected object and the vehicle 10 before slowing the vehicle 10. In particular, the controller 14 can be configured to slow the vehicle if the driver is inattentive, the distance between the vehicle 10 and the closest object is less than the inattentive brake distance, and the relative speed between the vehicle 10 and the object is approximately 1.5 meters per second or more.

In some embodiments, the controller 14 decelerates the vehicle 10 to bring the vehicle 10 to a standstill (at step 70). When the vehicle reaches a standstill, the controller 14 releases the brake pressure after a predetermined amount of time. For example, the controller 14 can retain the vehicle in a standstill condition for at least one second and until the driver takes over control of the vehicle 10 (e.g., by manually applying the brakes). In some embodiments, if the driver does not take over control of the vehicle 10 with a predetermined amount of time (e.g., 10 minutes), the controller 14 applies the vehicle's mechanical parking brakes to retain the vehicle 10 in a standstill until the driver manually releases the parking brakes. Once the vehicle 10 has reached a standstill (at step 70), the controller 14 returns to the standby state (at step 52).

In some embodiments, if the driver's attention level is no longer considered "inattentive" (i.e., the driver's attention level is set to "attentive"), the controller 14 takes no further actions to warn the driver or mitigate a collision. In other embodiments, even if the driver is considered "attentive," the controller 14 takes one or more actions to warn the driver and/or mitigate potential collisions. For example, as illustrated in FIG. 3, if the distance between the closest detected object and the vehicle 10 is less than a third predetermined distance (i.e., an attentive pre-fill distance) (at step 80) and the driver's attention level is set to "attentive" (at step 82), the controller 14 pre-fills at least one of the brake lines of the vehicle 10 to prepare the vehicle for braking (at step 84). It should be understood that, in some embodiments, the attentive pre-fill distance is different than the inattentive jerk distance and the inattentive brake distance. For example, in some embodiments, the attentive pre-fill distance is approximately 1.0 meter. In some embodiments, the controller 14 also checks the relative speed between the vehicle 10 and the closest detected object before pre-filling the brake lines. For example, the controller 14 can be configured to pre-fill the brake lines when the driver is attentive, the distance between the vehicle 10 and the closest detected object is less than attentive pre-fill distance, and the relative speed between the vehicle 10 and the object is approximately 1.0 meter per second or more.

In some embodiments, the controller 14 also slows the vehicle 10 to a standstill even when the driver's attention level is set to "attentive." For example, as illustrated in FIG. 3, if the current distance between the closest detected object and the vehicle 10 is less than a fourth predetermined distance (i.e., an attentive brake distance) (at step 86) and the driver is considered "attentive" (at step 82), the controller 14 slows the vehicle 10 (at step 88) to a standstill (at step 70). It should be understood that, in some embodiments, the attentive brake distance is different than the inattentive brake distance. For example, the attentive brake distance can be less than the inattentive brake distance and can be approximately 0.75 meters. Furthermore, as described below with respect to FIGS. 5A, 5B, and 6, the controller 14 can be configured to request a different brake application and/or torque reduction to slow the vehicle 10 depending on whether the driver is "attentive" or "inattentive." Also, in some embodiments, the controller 14 determines a relative speed between the closest detected object and the vehicle 10 before slowing the vehicle 10. For example, the controller 14 can be configured to slow the vehicle 10 for an attentive driver if the distance between the vehicle 10 and the closest detected object is less than the attentive brake distance and the relative speed between the object and the vehicle 10 is approximately 1.0 meter per second or more.

Accordingly, as described above, the controller 14 receives information from the object detection controller 12 and automatically determines if the driver should be warned and/or if the vehicle 10 should be slowed or stopped to mitigate a collision. In addition, the particular function taken by the controller 14 (and the strength or levels of such functions) is based on the vehicle's current velocity, the distance to the closest object detected around the vehicle, and the attention level of the driver. For example, FIG. 4 illustrates a distance between a detected object and a vehicle over time. FIG. 4 also illustrates when the controller 14 takes particular collision mitigation actions based on the distance to the detected object. In addition, FIG. 5A illustrates brake pressure applied by the controller 14 to mitigate a collision when the driver's attention level is set to "inattentive." Similarly, FIG. 5B illustrates brake pressure applied by the controller 14 to mitigation a collision when the driver's attention level is set to "attentive." Furthermore, FIG. 6 illustrates vehicle deceleration performed by the controller 14 during collision mitigation for both an inattentive driver and an attentive driver.

Figure 6:
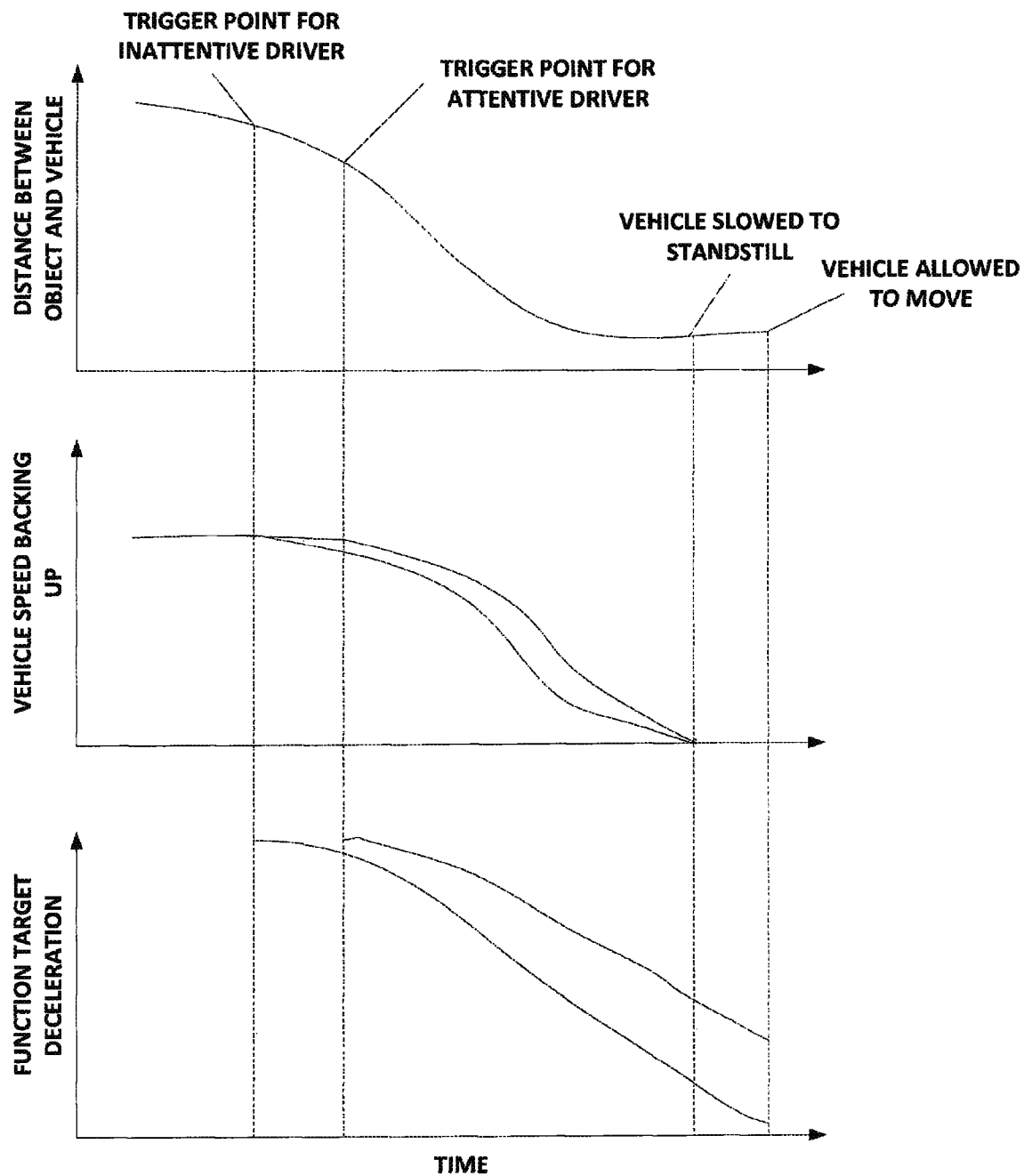
FIG. 6 illustrates vehicle deceleration during collision mitigation for both an inattentive driver and an attentive driver.

Accordingly, as illustrated in FIGS. 5A, 5B, and 6, the activation threshold of the above functions are adaptive and are changed in approximately real-time (based, for example, on the driver's attention level) to avoid unnecessary function activation and reduce total system noise, vibration, and harshness ("NVH"). For example, as illustrated in FIG. 6, the target deceleration requested by the controller 14 is dependent on the target speed, the distance to the closest detected object, and the driver's attention level.

In some embodiments, the controller 14 is also configured to provide the driver with warnings before, during, or after taking an automatic action to mitigation a collision. For example, the controller 14 can provide one or more visual, audible, and/or tactile warnings to the driver when it takes a particular action (e.g., when pre-filling brake lines, when performing a brake jerk, and/or when automatically slowing the vehicle). In other embodiments, the controller 14 is configured to provide one or more visual, audible, and/or tactile warnings to the driver whenever the driver's attention level is set to "inattentive."

It should be understood that the functionality of the object detection controller 12 and the collision mitigation controller 14 can be combined and distributed in various configurations. For example, in some embodiments, the collisions mitigation controller 14 can be combined with the object detection controller 12. In addition, it should be understood that the controller 14 can be configured to set the driver attention level based on other signals than those described herein. In general, the controller 14 can set the driver attention level based on any received signals that indicate whether the driver is concentrating on driving or is performing other non-driving related activities (e.g., operating one or more windows, removing or placing objects into the cup-holder, adjusting a temperature in the vehicle, adjusting a seat in the vehicle, opening a glove compartment or other storage location, using a mirror contained in a sun visor, etc.).

Thus, embodiments of the invention provide, among other things, systems and methods for warning a driver of potential collisions during various vehicle maneuvers and mitigation collisions during the maneuvers. In particular, as described above, the systems and methods perform collision mitigation based on a distance to a detected object, vehicle speed, and a driver attentiveness level. Furthermore, the collision mitigation performed by the systems and methods take a variety of actions to prevent collisions or reduce the impact of a collision. For example, instead of either issuing a warning to a driver or automatically braking the vehicle, the disclosed systems and methods prepare the vehicle for a possible collision and reduce the kinetic energy of the vehicle (e.g., by prefilling the brake lines and/or performing a brake jerk).

Also, it should be understood that the predetermined distances described above for the various actions taken by the systems and methods can vary based on the current attention level of the driver, the relative speed between a detected object and the vehicle, and the position of the detected object. In particular, the distances used in steps 60, 66, 80, and 86 described above with respect to FIG. 3 may all be different. Furthermore, the values of these distances can dynamically vary based on the relationship between the relative speed between the vehicle and the object and the distance to the object. For example, the faster the vehicle 10 travels with respect to the detected object, the greater the distance. Furthermore, these distances can vary based on the vehicle's braking system, a vehicle load, etc. In addition, as illustrated in FIG. 3, the sequence of actions taken by the disclosed systems and methods can vary based on driver attention level (e.g., when the driver becomes inattentive) and the distance to the closest object.

Furthermore, as described above, the disclosed systems and methods identify driver attentiveness without requiring specially-designed device, such as cameras or other sensor, installed in the interior of the vehicle. In particular, the systems and methods determine an attention level of a driver based on signals that are already available in the vehicle (e.g., available over the CAN bus). Accordingly, eliminating the need for these additional devices reduces the cost and complexity of the disclosed systems and methods.

Various features and advantages of the invention are set forth in the following claims.

What is claimed is:

1. A system for mitigating vehicle collisions, the system comprising:
a processor configured to:
set a driver attention level to at least one of an attentive level and an inattentive level based on a driver's interaction with at least one from the group of a vehicle control device and an entertainment system located within a vehicle,
automatically pre-fill at least one brake line of the vehicle without automatically applying vehicle brakes when the driver attention level is set to the inattentive level,
automatically perform a brake jerk when the driver attention level is set to the inattentive level and a distance between the vehicle and a closest object detected around the vehicle is less than a first predetermined distance, and
automatically slow the vehicle when the driver attention level is set to the inattentive level and a distance between the vehicle and a closest object detected around the vehicle is less than a second predetermined distance,
wherein the processor is configured to set the driver attention level to the attentive level when the driver is not interacting with an entertainment system located within the vehicle and at least one turn indicator located within the vehicle is active.

2. A system for mitigating vehicle collisions, the system comprising:
a processor configured to:
set a driver attention level to at least one of an attentive level and an inattentive level based on a driver's interaction with at least one from the group of a vehicle control device and an entertainment system located within a vehicle,
automatically pre-fill at least one brake line of the vehicle without automatically applying vehicle brakes when the driver attention level is set to the inattentive level,
automatically perform a brake jerk when the driver attention level is set to the inattentive level and a distance between the vehicle and a closest object detected around the vehicle is less than a first predetermined distance, and
automatically slow the vehicle when the driver attention level is set to the inattentive level and a distance between the vehicle and a closest object detected around the vehicle is less than a second predetermined distance,
wherein the processor is configured to set the driver attention level to the attentive level when the driver is not interacting with an entertainment system located within the vehicle and a steering angle of the vehicle has changed within a past predetermined period of time.

3. The system of claim 2, wherein the processor is configured to automatically slow the vehicle based on a current velocity of the vehicle and the distance between the vehicle and a closest object detected around the vehicle.

4. The system of claim 2, wherein the vehicle control device includes at least one from the group of a turn indicator and a steering wheel.

5. The system of claim 2, wherein the processor is configured to set the driver attention level to the inattentive level when the driver is interacting with an entertainment system located within the vehicle.

6. The system of claim 2, wherein the processor is configured to set the driver attention level to the inattentive level when no turn indicator of the vehicle is active and a steering angle of the vehicle has not changed within a past predetermined period of time.

7. A method for mitigating vehicle collisions, the method comprising:
setting, at a processor, a driver attention level based on a driver's interaction with at least one from the group of an entertainment system, a turn indicator, and a steering wheel located within a vehicle, wherein the driver attention level is set to at least one of an attentive level and an inattentive level; and
automatically controlling at least a portion of the vehicle based on the driver attention level, a current vehicle velocity, and a distance between the vehicle and a closest object detected around the vehicle in a series of actions, wherein automatically controlling at least a portion of the vehicle includes automatically pre-filling at least one brake line of the vehicle as a first action, automatically performing a brake jerk of the vehicle as a second action, and automatically slowing the vehicle as a third action,
wherein automatically pre-filling at least one brake line of the vehicle includes automatically pre-filling the at least one brake line when the driver attention level is set to the inattentive level and the distance is less than a predetermined distance,
wherein automatically performing the brake jerk includes performing the brake jerk when the driver attention level is set to inattentive and the distance is less than a second predetermined distance,
wherein automatically slowing the vehicle includes slowing the vehicle to a standstill and maintaining the vehicle at the standstill for a predetermined time when the driver attention level is set to inattentive and the distance is less than a third predetermined distance.

8. The method of claim 7, further comprising providing a warning to the driver when the driver attention level is set to the inattentive level.

9. The method of claim 7, wherein automatically controlling the vehicle based on the current vehicle velocity includes automatically controlling the vehicle based on a relative speed between the vehicle and the closest object.

10. A method for mitigating vehicle collisions, the method comprising:
setting, at a processor, a driver attention level based on a driver's interaction with at least one from the group of an entertainment system, a turn indicator, and a steering wheel located within a vehicle, wherein the driver attention level is set to at least one of an attentive level and an inattentive level; and
automatically controlling at least a portion of the vehicle based on the driver attention level, a current vehicle velocity, and a distance between the vehicle and a closest object detected around the vehicle in a series of actions, wherein automatically controlling at least a portion of the vehicle includes automatically pre-filling at least one brake line of the vehicle as a first action, automatically performing a brake jerk of the vehicle as a second action, and automatically slowing the vehicle as a third action,
wherein setting the driver attention level includes setting the driver attention level to the attentive level when the driver is not interacting with the entertainment system and has turned the steering wheel within a past predetermined period of time.

11. The method of claim 10, wherein automatically pre-filling at least one brake line of the vehicle includes automatically pre-filling the at least one brake line when the driver attention level is set to the inattentive level and the distance is less than a predetermined distance.

12. The method of claim 11, wherein automatically pre-filling the at least one brake line includes pre-filling the at least one brake line without automatically applying vehicle brakes.

13. A method for mitigating vehicle collisions, the method comprising:
   setting, at a processor, a driver attention level based on a driver's interaction with at least one from the group of an entertainment system, a turn indicator, and a steering wheel located within a vehicle, wherein the driver attention level is set to at least one of an attentive level and an inattentive level; and
   automatically controlling at least a portion of the vehicle based on the driver attention level, a current vehicle velocity, and a distance between the vehicle and a closest object detected around the vehicle in a series of actions, wherein automatically controlling at least a portion of the vehicle includes automatically pre-filling at least one brake line of the vehicle as a first action, automatically performing a brake jerk of the vehicle as a second action, and automatically slowing the vehicle as a third action,
   wherein setting the driver attention level includes setting the driver attention level to the attentive level when the driver is not interacting with the entertainment system and the at least one turn indicator is active.

* * * * *